Feb. 27, 1968  A. L. CROWSON  3,370,835
ADJUSTABLE WORKING CHUTE
Filed Oct. 5, 1965  3 Sheets-Sheet 2

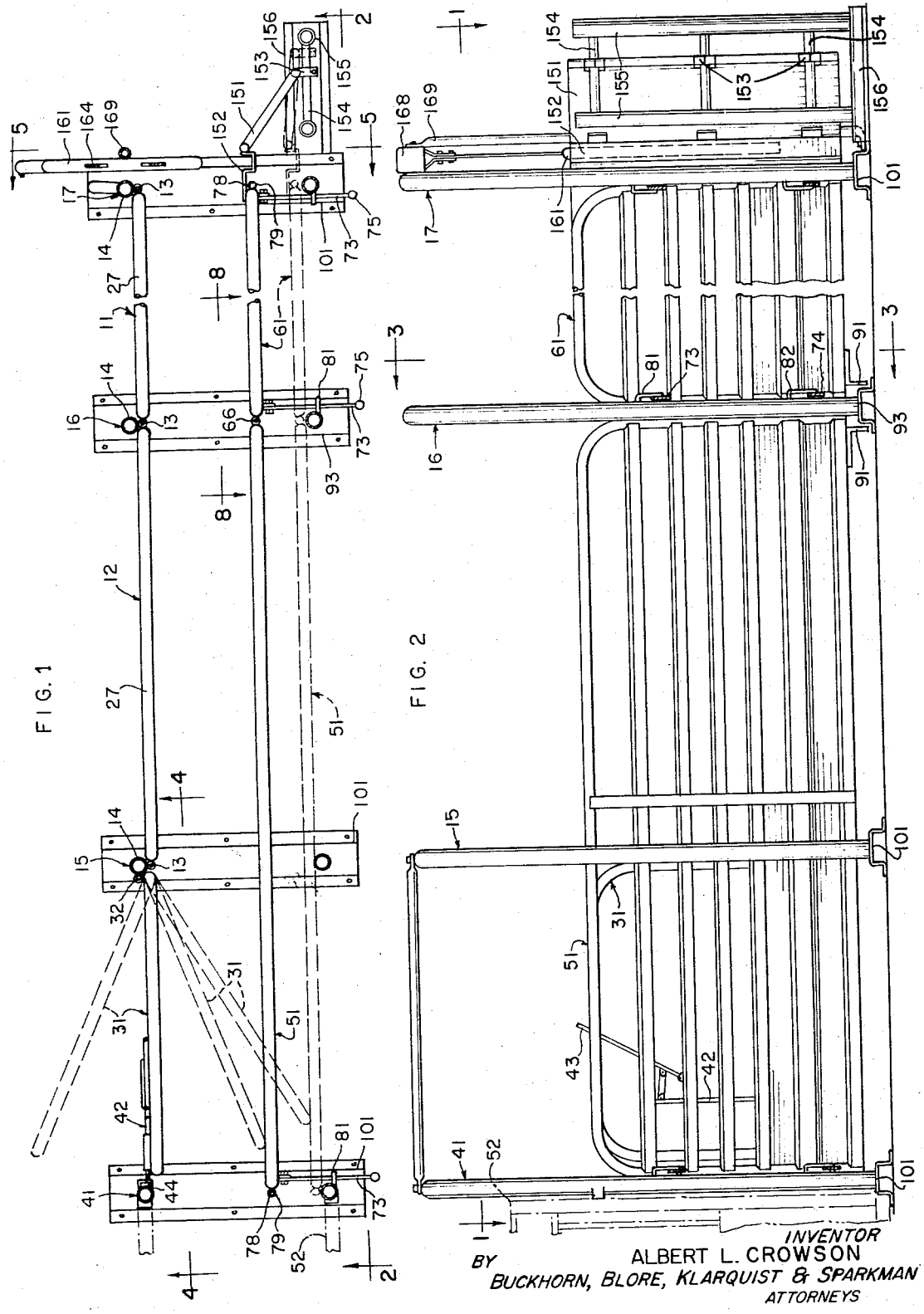

INVENTOR
ALBERT L. CROWSON
BY BUCKHORN, BLORE, KLARQUIST & SPARKMAN
ATTORNEYS

Feb. 27, 1968  A. L. CROWSON  3,370,835
ADJUSTABLE WORKING CHUTE
Filed Oct. 5, 1965  3 Sheets-Sheet 3
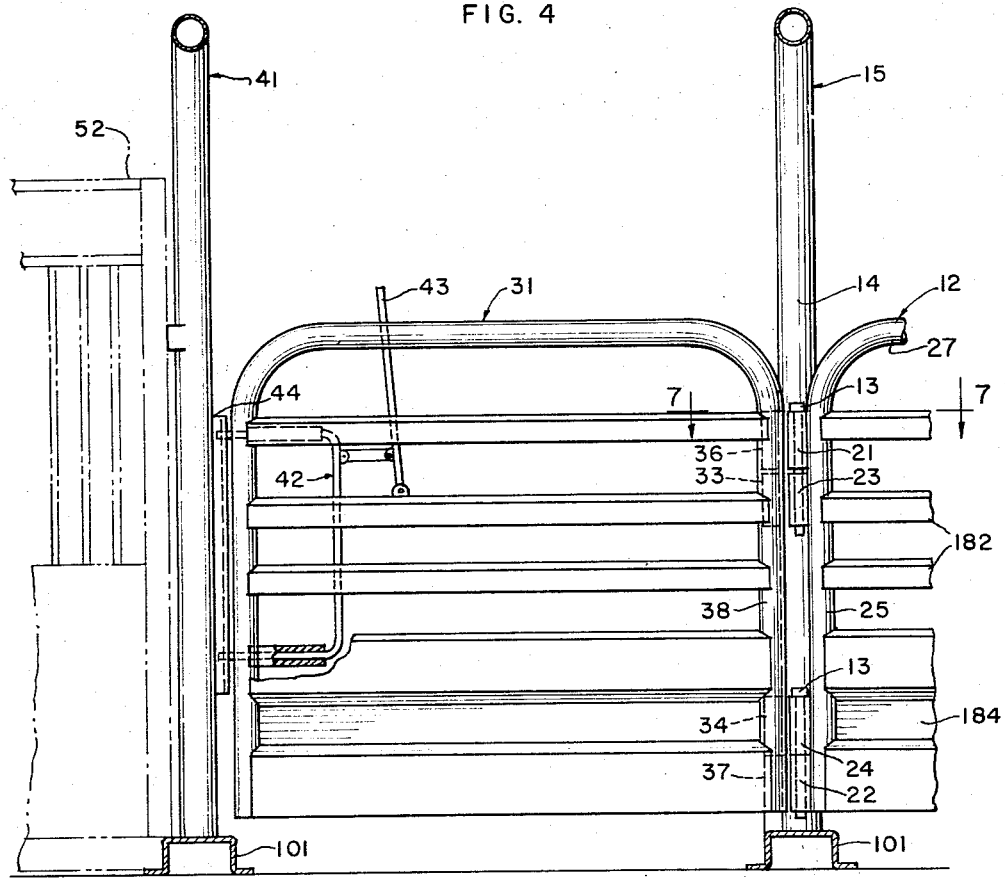
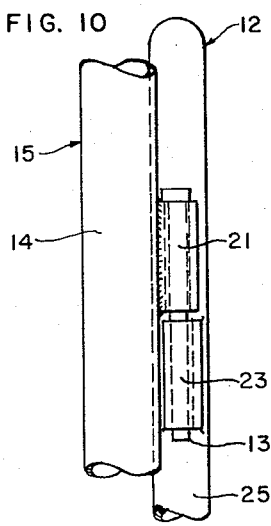
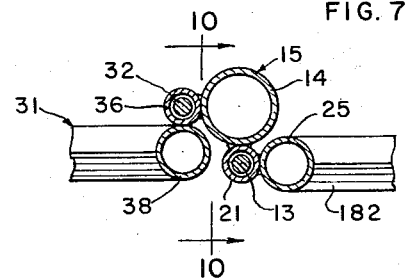
INVENTOR
ALBERT L. CROWSON
BY
BUCKHORN, BLORE, KLARQUIST & SPARKMAN
ATTORNEYS

United States Patent Office 3,370,835
Patented Feb. 27, 1968

3,370,835
ADJUSTABLE WORKING CHUTE
Albert L. Crowson, Baker, Oreg., assignor to Commercial Welding Co., Inc., Baker, Oreg., a corporation of Oregon
Filed Oct. 5, 1965, Ser. No. 493,087
9 Claims. (Cl. 256—26)

ABSTRACT OF THE DISCLOSURE

A working chute has fixed side panels secured to one side of arched frames having combined bases and guide. Adjustable side panels are suspended from the frames by links pivoted to the tops of the frames and are guided by the bases of the frames. A dart gate is mounted to one of the frames for movement between a first position opening outwardly of the chute, a second, closed position forming a portion of the side of the chute, and a third position extending across the chute. At the entrance end of the chute one end of an entrance panel is pivotal on the end adjustable side panel and the other end of the entrance panel is slidable along a line parallel to the chute.

---

This invention relates to an improved livestock chute, and more particularly to an adjustable cattle working chute.

An object of the invention is to provide a new and improved livestock chute.

Another object of the invention is to provide an adjustable cattle working chute.

A further object of the invention is to provide a cattle working chute having a simple, effective, suspending device mounting a side of the chute adjustably so that the width of the chute may be adjusted.

Another object of the invention is to provide an adjustable cattle working chute of simple, rugged construction.

A still further object of the invention is to provide an adjustable cattle working chute having a gate which may be selectively moved between a position forming one side of the chute, a second position closing the chute and keeping cattle within the chute, and a third position opening the chute to discharge animals from the side thereof.

A further object of the invention is to provide an adjustable cattle working chute having an adjustably canted guiding panel at the entrance end thereof which is hinged to an adjustable side panel of the chute so that the guide panel will always connect to the side panel regardless of the position of adjustment of the side panel.

The invention provides an adjustable livestock working chute including a fixed side and an adjustable side adapted to be moved to adjusted positions either closer to or farther from the fixed side. Preferably the chute includes, at the entrance end thereof, a canted guide panel adapted to guide animals into the chute and hinged at one end thereof to the adjustable side of the chute and slidable along a guide at the other end thereof so that, as the adjustable side of the chute is moved inwardly or outwardly relative to the fixed side of the chute, the end of the guide panel attached to the adjustable side follows the adjustable side. There also preferably is provided adjacent the discharge end of the chute a gate member hinged at an end thereof remote from the discharge end of the chute and adapted to be selectively moved between a first position extending parallel to the adjustable side of the chute to form an extension of the fixed side of the chute, a second position extending across the chute to block egress from the chute, and a third position in which the gate is swung outwardly to open the chute for discharging cattle from the side thereof. Preferably the chute includes a plurality of bow frames having tubular panel hangers thereon through which a connecting rod may be inserted, the connecting rod passing through tubular panel hangers of the panels forming the sides of the chute. There also is preferably provided at the entrance end of the chute an elevated track carried by the bow frame at that end of the chute and an entrance gate slidably suspended from the track for opening and closing the entrance to the chute.

A complete understanding of the invention may be obtained from the following detailed description of an adjustable livestock chute forming a specific embodiment thereof, when read in conjunction with the appended drawings, in which:

FIG. 1 is a horizontal, partially sectional view of an adjustable livestock chute forming one embodiment of the invention and taken substantially along line 1—1 of FIG. 2;

FIG. 2 is a side elevation view taken substantially along line 2—2 of FIG. 1;

FIG. 4 is a fragmentary, vertical sectional view taken substantially along line 4—4 of FIG. 1;

FIG. 7 is a horizontal sectional view taken along line 7—7 of FIG. 4.

FIG. 10 is an enlarged, fragmentary, vertical sectional view taken substantially along line 10—10 of FIG. 7.

Figure 3:
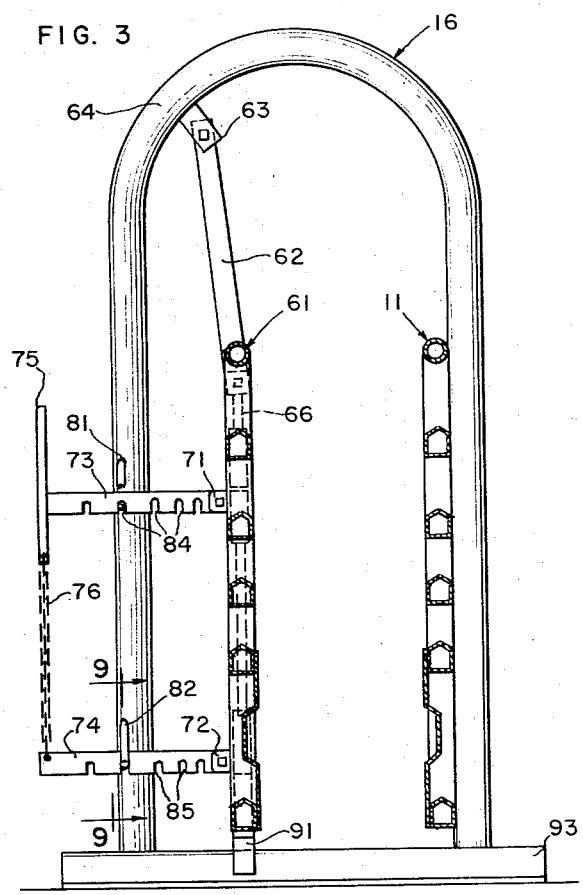
FIG. 3 is a vertical sectional view taken substantially along line 3—3 of FIG. 2.

Referring now in detail to the drawings, there is shown therein an adjustable livestock working chute. There are shown in FIGS. 1 and 2 side panels 11 and 12 fixed by pintles 13 to post portions 14 of bow frames 15, 16 and 17 to form a fixed panel side. As best shown in FIGS. 4 and 10, the pintles 13 and extend through eye members or pipe sections 21 and 22 secured rigidly to the post portions 14, and similar eye members or pipe sections 23 and 24 fixed rigidly to vertical end or post portions 25 of U-shaped tubular frame members 27 of the side sections 11 and 12.

A dart gate 31 is hinged by pintles 32 passing through pipe sections 33 and 34 fixed to the post portion 14 of the bow frame 15 and short pipe sections 36 and 37 secured to U-shaped pipe or hollow frame member 38 of the dart gate 31. The dart gate 31, when in a first position, extends from the bow frame 15 to an exit bow frame 41 and forms a continuation of the fixed side of the chute formed by the side panels 11 and 12. The dart gate includes a latch 42 operable manually by a handle 43 and adapted to engage latching portions of post portion 44 of the bow frame 41 when the dart gate is in the first position thereof forming an extension of the side formed by the panels 11 and 12. The latch 42 may be released and the dart gate swung inwardly relative to the chute to a position in engagement with a side panel member 51 (FIG. 1) to close the exit or discharge end of the chute to permit a man to be ahead of the dart gate and near the bow frame 41 to work on an animal in a squeeze chute 52 positioned at the discharge end of the working chute. The dart gate also may be swung outwardly away from the side panel 51 to a side discharge position opening the side of the working chute to permit an animal to be discharged from the chute and diverted from the squeeze chute 52 when desired, as illustrated by the uppermost position of the dart gate 31 shown in broken line in FIG. 1.

Figure 8:
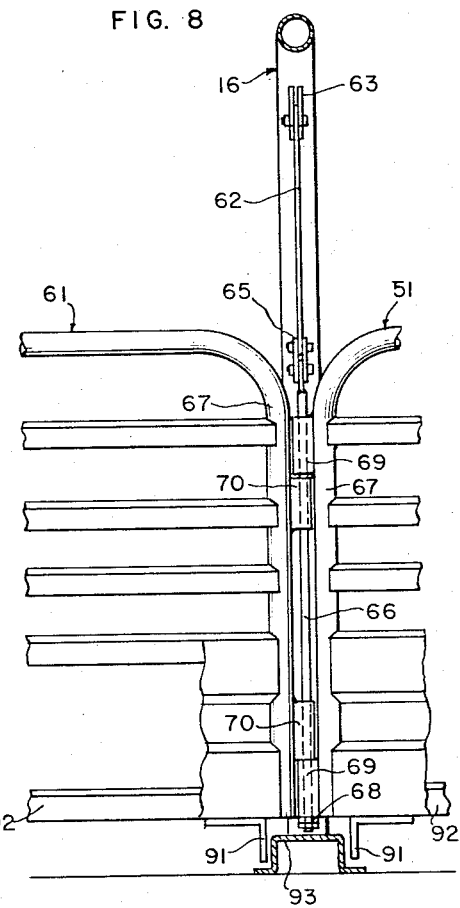
FIG. 8 is an enlarged, vertical, sectional view taken substantially along line 8—8 of FIG. 1.

The panel 51 and a panel 61 (FIG. 1) form an adjustable side of the working chute to permit the chute to be widened or narrowed, depending on whether large, full grown cattle, small calves, or cattle or calves of intermediate size are to be run therethrough. The panels 51 and 61 are carried by swing bars or links 62 (FIGS. 3 and 8) pivotally suspended by brackets 63 fixed to top portions 64 of the bow frames 15, 16, 17 and 41. The lower ends of the links 62 are connected pivotally to clevises 65.

Connecting rods or pintles 66, to which the clevises 65 are secured, pass through tubular hinge or pipe sections 69 and 70 formed of short lengths of pipes fixed to the vertical end portions of the members 67. A nut 68 threaded onto the lower end of the rod 66 engages the lower hinge member 69 to support the panels 51 and 61, the upper hinge member 70 resting on and being supported by the lower hinge member 69. The other ends of the panels 51 and 61 are supported similarly by the links 62 pivoted on the hinge brackets 63 carried by the upper, arcuate portions of the bow frames 17 and 41 (FIG. 1) in positions aligned laterally with the bracket 63 on the bow frame 16. Connecting rods or pintles 78 connect the other ends of the panels 51 and 61 to the straps or swing bars 62 carried by the bow frames 41 and 17, respectively, the connecting rods 78 projecting through tubular hinge members or pipe sections 79 secured to these ends of the panels. Nuts (not shown) corresponding to the nut 68 (FIG. 8) are threaded on the lower ends of the rods 78 (FIG. 1) and engage the pipe sections 79 to support the panels.

The connecting rods 66 and 78 serve as pintles to hinge the panels on vertical axes to the swing bars 62 and this permits connected pairs of width adjustment or latching bars 73 and 74 carried by the panels 51 and 61 to be actuated one pair at a time by the user. That is, there is sufficient play in the connections of the swing bars 62, the brackets 63 and the clevises 65 to permit the adjacent ends of the panels to be moved laterally somewhat relative to the other, remote ends of the panels and either remote end of either panel to be moved laterally somewhat relative to the other end of that panel. Hence, the pairs of width adjustment bars 73 (FIGS. 1 and 3) need not be actuated at the same time and may be actuated sequentially to effect an adjustment without interference from binding of the several suspending mechanisms of the panels. This is especially important if only one operator is present to make the adjustment of width of the chute. The frames 67 carry rigidly thereon lugs 71 and 72 to which latching bars 73 and 74 are pivotally pinned or connected. Tubular handles 75 are fixed rigidly to the outer ends of the latching bars 73, and chains 76 connect the lower ends of the handles 75 to the outer ends of the latching bar 74. The latching bars 73 and 74 extend slidably through fixed, U-shaped latch catches 81 and 82, respectively, secured to the bow frames 16, 17 and 41. The latching bars 73 are provided with notches 84, and the latching bars 74 are provided with notches 85 spaced along the lower edges thereof, which are adapted to engage the catches 81 and 82 and hold the latching bars against endwise movement of the latching bars 73 and 74 relative to the catches 81 and 82, thereby holding the side panels 51 and 61 in adjusted positions. When it is desired to adjust the panels 51 and 61 the operator merely lifts the handles 75 to lift the latching bars 73 out of latching engagement with the bottom portions of the catches 81, and the chains 76 lift the lower latching bars 74 out of latching engagement with the catches 82. The handles 75 then may be pushed or pulled, depending on the adjustment desired, to move the panels 51 and 61 closer to the fixed side panels 11 and 12 or further therefrom, as desired. Then the handles 75 are lowered to move the latching bars 73 into latching engagement with the catches 81 and the latching bars 74 move by gravity into latching engagement with the catches 82. The panels 51 and 61, since they are suspended by the links 62, remain in the vertical positions throughout the adjustments thereof.

Figure 5:
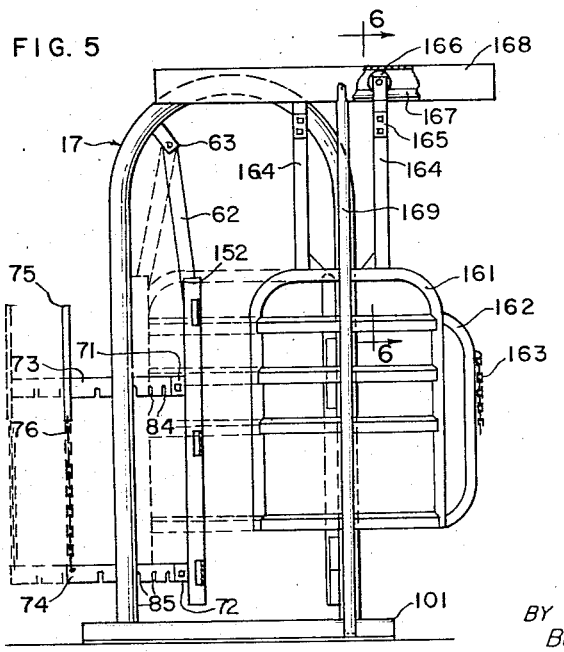
FIG. 5 is a vertical, sectional view taken substantially along line 5—5 of FIG. 1.
Figure 6:
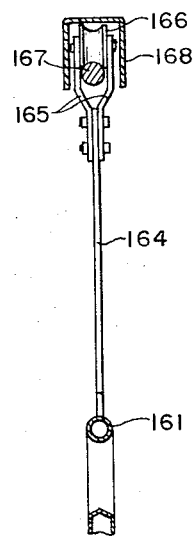
FIG. 6 is an enlarged, fragmentary, vertical, sectional view taken substantially along line 6—6 of FIG. 5.
Figure 9:
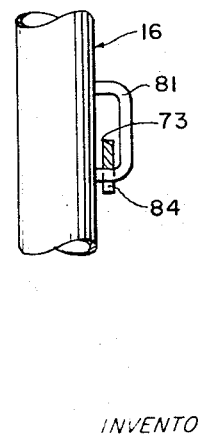
FIG. 9 is an enlarged, fragmentary vertical sectional view taken substantially along line 9—9 of FIG. 3.

As best illustrated in FIG. 9, the latch catches 81 are U-shaped and are welded or brazed to the tubular bow frames 16, 17 and 41 at the same level and guide the latching bars 73. The latch catches 82 (FIG. 3) are similar to the latch catches 81 and are similarly secured to the bow frames 16, 17 and 41 at the same level. L-shaped guides 91 (FIG. 8) are brazed or welded to the adjacent end portions of bottom frame members 92 of the panels 51 and 61, and loosely bracket base channel 93 forming a part of and integral with the bow frame 16 to spline the panels 51 and 61 to the bow frame. That is, the guides 91 engage loosely the sides of the channel 93 and permit movement of the guide along the channel and upwardly relative to the channel but prevent movement of the guides horizontally transversely to the channel 93. This keeps the panels 51 and 61 from more than slight longitudinal movement thereof relative to the channels. Base channels 101 (FIG. 5) are provided at the bottoms of the bow frames 15, 17 and 41 and are integral therewith.

As best shown in FIGS. 1 and 2, a canted entrance guide panel 151 is hinged at one side to a vertical channel 152 welded to the entrance end of the panel 61. The entrance guide panel 151 is hinged at its other end to slides 153 slidable along parallel rods 154 fixed rigidly to posts 155 fixed rigidly to a base channel 156. The base channel 156 is fixed in a position at the end portion of and extending along a fence or rail (not shown). The guide panel 151 smoothly joins the end of the fence to the end of the panel 61 regardless of the adjusted position of the panel 61, The channel 152 acts as a stop for an entrance gate 161 having a handle 162 (FIG. 5) and a latching chain 163. The gate is carried by straps 164 suspended by clevises 165 secured to grooved rollers 166 movable along trolley rail or rod 167 secured at its ends to a channel 168. The gate is movable between the bow frame 17 and a vertical, tubular post 169 secured at its lower end to the base channel 101 and at its upper end to the channel 168. The channel 168 is welded to the upper portion of the bow frame 17 (FIG. 2).

The panels 11, 12, 51 and 61 and the gate 31 (FIGS. 1 and 2) are of the same general construction, and only the panel 12 will be described in detail. The panel 12 includes the U-shaped tubular frame member 27 (FIG. 4) with channel-like rail or cross members 182 extending between and welded to vertical post members 25 of the frame members 27. A corrugated sheet 184 is welded to the lowermost cross members 182 to close the lower portions of the panels to prevent the cattle from getting their legs between the rails.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:
1. In combination:
   a plurality of bow frames mounted in spaced, laterally aligned positions and each having a pair of post portions and an overhead portion connecting the post portions,
   a first fence panel,
   means securing the first fence panel to the post portions to form one side of a chute,
   a second fence panel,
   a plurality of link members hinged to the upper portions of the bow frames and also hinged to the upper portion of the second fence panel to suspend the second fence panel in a position forming the other side of the chute and parallel to the first fence panel and permit the second fence panel to be moved toward and away from the first fence panel, a plurality of adjustment members engaging the second fence panel, and latch means for securing the adjustment members to the post portions in adjusted positions in which the adjustment members hold the second fence panel in adjusted positions relative to the first fence panel.

2. In combination:
a plurality of frame members including a plurality of post portions mounted in a line,
a fence panel,
fence means secured to the post portions in a position facing the fence panel,
a plurality of linkages suspending the fence panel from the upper portions of the frame members and providing for lateral movement of the fence panel toward and away from the post portions,
a plurality of latch catches mounted in vertically spaced pairs on the post portions,
and a plurality of latch bars having notched edges and pivotally secured to the fence panel in vertically spaced pairs and extending through the latch catches for engaging the latch catches serving to hold the fence panel in selected positions relative to the post portions.

3. The combination of claim 2 including a plurality of handles connected to the upper ones of the pairs of latch bars,
and means connecting the free end portions of the lower ones of the latch bars to the upper ones of the latch bars so that, when the upper ones of the latch bars are moved relative to the latch catches, the lower ones of the latch bars are moved relative to the latch catches.

4. In combination:
a plurality of fence panels,
means for hinging adjacent ends of the fence panels together,
means for supporting the panels for lateral movement,
a plurality of post members positioned adjacent the ends of the panels,
and a plurality of individually operable adjustment devices connecting the end portions of the fence panels to the post members.

5. In combination:
a plurality of bow frames each having a base channel an inverted pair of tubular post portions extending upwardly from the channel and a tubular arched portion connecting the upper ends of the post portions,
a first panel connected to the post portions at one side of the frames,
a second panel,
a plurality of linkage means each having one end pivoted to one of the bow frames and the other end pivoted to the second panel for supporting the second panel,
and adjustable means connecting the second panel to the posts at the other side of the frames for movement toward and away from the first panel,
the bottom portion of the second panel being provided with a guide member slidably engaging the channel.

6. In combination:
a pair of fence panels hinged together at adjacent ends thereof,
a pair of end frames at the other ends of the fence panels,
a central frame having a post portion and a raised base portion extending from one side of the post portion,
means for suspending the fence panels from the frames in positions at said one side of the post portion,
adjustable means connecting the fence panels to the frames for lateral movement of the fence panels over the base portion and relative to the post portion,
and a pair of guide members secured to the bottoms of the adjacent ends of the fence panels in downwardly extending positions bracketing the raised base portion of the frame for limiting endwise movement of the fence panels relative to the base portion of the frame.

7. In combination:
first fence panel means forming one side of a chute,
second fence panel means forming the other side of the chute,
means mounting the first fence panel means for transverse adjustment toward and away from the second fence panel means,
a guide panel hinged at one end to one end of the first fence panel means,
frame means having a pair of parallel guide rods positioned beyond said one end of the first fence panel means and extending parallel to the first fence panel means,
and a plurality of guide members slidable along the rods and hinged to the other end of the guide panel.

8. In combination:
a first fence panel means,
second fence panel means extending along and a predetermined distance beyond one end of the first fence panel means to form a working chute therewith,
a squeeze chute mounted at the end of the second panel means and adjacent said one of the first panel means,
a dart gate of a length equal to said distance and hinged to said one end of the first panel means and selectively movable between a first position extending to the squeeze chute and forming an extension of the first panel means, a second position extending away from the second panel means to provide a discharge opening and a third position extending to the second fence panel means to close the working chute,
means for latching the dart gate in the first position thereof,
and means for latching the dart gate in the third position thereof.

9. In combination:
first fence means forming one side of a chute,
and second fence means forming the other side of the chute and including a dart gate selectively movable between a first position extending parallel to and forming a part of the second fence means, a second position extending away from the first fence means to provide a dart opening and a third position extending to the first fence means to close the chute.

References Cited
UNITED STATES PATENTS

| | | | |
|---|---|---|---|
| 1,334,256 | 3/1920 | Morgan | 119—98 |
| 1,348,093 | 7/1920 | Garland et al. | 119—98 |
| 1,447,835 | 3/1923 | Coats | 119—98 |
| 2,229,588 | 1/1941 | Parker | 119—98 |
| 2,652,025 | 9/1953 | Beatty | 256—27 X |
| 3,194,213 | 7/1965 | Soukup | 119—98 |
| 3,204,606 | 9/1965 | Parr et al. | 119—20 |

FOREIGN PATENTS

| | | |
|---|---|---|
| 244,147 | 4/1963 | Australia. |
| 685,506 | 1/1953 | Great Britain. |
| 839,177 | 6/1960 | Great Britain. |

DAVID J. WILLIAMOWSKY, *Primary Examiner.*

DENNIS L. TAYLOR, *Assistant Examiner.*